US008352443B1

(12) United States Patent
Polson et al.

(10) Patent No.: US 8,352,443 B1
(45) Date of Patent: Jan. 8, 2013

(54) REPRESENTING SCENE DESCRIPTION IN DATABASES

(75) Inventors: William A. Polson, San Rafael, CA (US); Timothy S. Milliron, Menlo Park, CA (US); Brad Andalman, Oakland, CA (US)

(73) Assignee: Pixar, Emeryville, CA (US)

( * ) Notice: Subject to any disclaimer, the term of this patent is extended or adjusted under 35 U.S.C. 154(b) by 388 days.

(21) Appl. No.: 12/267,582

(22) Filed: Nov. 8, 2008

(51) Int. Cl.
*G06F 17/30* (2006.01)
*G06F 17/00* (2006.01)
(52) U.S. Cl. ......... 707/694; 707/705; 707/758; 382/293
(58) Field of Classification Search .................. 707/694, 707/705, 758; 386/95
See application file for complete search history.

(56) References Cited

U.S. PATENT DOCUMENTS

| | | | | |
|---|---|---|---|---|
| 5,852,823 | A | * | 12/1998 | De Bonet ...................... 382/279 |
| 6,014,664 | A | * | 1/2000 | Fagin et al. ................... 707/694 |
| 6,763,148 | B1 | * | 7/2004 | Sternberg et al. ............. 382/293 |
| 7,474,759 | B2 | * | 1/2009 | Sternberg et al. ............. 382/100 |
| 2009/0274435 | A1 | * | 11/2009 | Kobayashi et al. ............. 386/95 |

OTHER PUBLICATIONS

Kumar, Sanjeev et al., "Second Life and the New Generation of Virtual Worlds", "Computer", Sep. 2008, pp. 46-53, vol. 41, No. 9, Publisher: IEEE Computer Society Press, Published in: Los Alamitos, California USA.

* cited by examiner

*Primary Examiner* — Yicun Wu
(74) *Attorney, Agent, or Firm* — Kilpatrick Townsend & Stockton LLP (57) ABSTRACT

Digital production assets and their attributes are stored directly in a scene description database, without any association with a specific enclosing asset data file. Software applications perform database queries to retrieve assets and attributes from the database. Changes to assets or new assets are stored in the database. Query results may be cached to improve performance. Heterogeneous opinion sets including sparse opinions of attribute values may be used to specify scene description data. The database stores heterogeneous opinion set data in association with attribute values. Database-aware applications may change the scene description data in the database without loading, parsing, and instantiating scene description data. An application generates database queries and instantiates scene description data from query results for access and manipulation by other applications.

48 Claims, 5 Drawing Sheets

REPRESENTING SCENE DESCRIPTION IN DATABASES

BACKGROUND

The present invention relates to the field of computer graphics, and in particular to methods and apparatus for creating, modifying, and using components to create computer graphics productions. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Computer graphics images, animations, and other productions involving computer graphics, such as interactive entertainment software, are created from a number of different components. Generally, components include any data and instructions used to create products and applications that include computer graphics. Components can include three-dimensional models of geometry; texture maps, other arrays of data, lighting, and shading programs used to determine the visual appearance of models; and animation data and deformer functions used to specify changes and motion over time. One or more components are typically stored as a digital asset.

Components typically include one or more attributes containing data associated with the component. Attributes can specify any static or varying property of a component. For example, a component may be a model of a sphere. Attributes of this example component could describe properties such as the radius of the sphere and the location of the center of the sphere. Different types of components may include different numbers and types of attributes. Components are often related to each other with complex cross-reference, inheritance, and dependency relationships.

Digital production pipelines previously stored its digital assets in data files. Some systems arrange data files in a complex hierarchical file system. Other systems use databases to store the location of data files and metadata summarizing the contents of data files.

Managing the large number of inter-related data files is a complex task. In a computer graphics system using a file system hierarchy, any errors in the placement of a data file or the specification of a file path may result in erroneous output. Because of the complex relationships between components, the source of the erroneous output and the appropriate correction may not obvious to users. Additionally, if a small change is made to a digital asset, prior data file-based systems often must rewrite the entire digital asset data file.

Furthermore, it is difficult to search for and/or selectively modify digital assets matching specific criteria. Even systems that store digital asset metadata in databases are limited in their search capabilities, because the metadata only summarizes the contents of digital assets. Users and applications normally cannot use any arbitrary attribute or characteristic of a digital asset as a search criteria unless metadata has already been generated for this attribute or characteristic. If metadata for an attribute or characteristic does not exist, the only alternative is to load each data file into the appropriate application, parse all of the data in the data file to instantiate all of the components in the data file in memory, and then search the instantiated components for the desired attribute. For digital productions with large numbers of enormous data files, this process can take hours or days, which makes it impractical for most uses.

Therefore, there is an unmet need for a system and method to improve the ease, efficiency, and reliability of the creation, modification, and management of components and digital assets in digital production pipelines. There is also an unmet need for a system and method to search and/or modify components based on arbitrarily complex and specific criteria. There is also an unmet need for database systems, database methods, and database structures to enable unrestricted and progressive modifications, refinements, and variations of any type of data by one or more users or applications, such as in a collaborative environment.

BRIEF SUMMARY OF THE INVENTION

An embodiment of the invention stores digital production assets and their attributes directly in a scene description database, without any association with a specific enclosing asset data file. Digital production software applications perform database queries to retrieve any required assets and attributes from the scene description database. Any changes to existing assets or new assets created by digital production software applications are stored in the scene description database. In a further embodiment, the digital production software applications or the scene description database may cache query results to improve performance.

In an embodiment, layers including sparse opinions of attribute values may be used to specify scene description data. The scene description database may stores layer data in association with their encapsulated attribute values.

In an embodiment, if a small change is made to a digital asset, the scene description database only needs to commit the changed attributes to the database. In a further embodiment, database aware applications may make changes to the scene description data in the scene description database without loading, parsing, and instantiating unnecessary related scene description data. In an embodiment, an instantiation application generates database queries and instantiates scene description data from query results for access and manipulation by other applications. Changes to instantiated scene description data are committed back to the scene description database by database-aware applications or by an instantiation application.

An embodiment of the scene description database allows for complex queries and modifications of digital assets. For example, users can select a set of digital assets according to any criteria, including the values of any of their attributes. Once this set is selected, the assets of this set may be loaded into memory, instantiated, modified in any way, and stored back into memory without requiring any processing, manipulation, or instantiation of any other assets.

An embodiment of the invention also includes a general database application with layering and resolving functionality. In this embodiment, attributes of data records in a database table may be associated with a layer. Multiple opinions of value of a single attribute may be defined in association with separate layers. A database query may specify a layer stacking order or rely on an intrinsic layer stacking order to select and order a set of layers associated with a database query. Database records matching query selection criteria are selected and resolved from layers according to the layer stacking order and formatted to create a resolved query result.

BRIEF DESCRIPTION OF THE DRAWINGS

The invention will be described with reference to the drawings, in which.

DETAILED DESCRIPTION OF THE INVENTION

An embodiment of the invention stores digital assets, components, and their attributes, referred to generically as scene description, directly in a database, without any association with a specific enclosing asset data file. Digital production software applications perform database queries to retrieve any required assets, components, and attributes from the database. Digital production software applications instantiate components in memory directly from the results of database queries for viewing, editing, rendering, or any other type of operation. Any changes to the scene description or new digital assets, components, or attributes created by digital production software applications are stored in the database.

Storing scene description, such as digital assets, components, and their attributes, in a database provides several advantages over traditional digital asset data files. First, if a small change is made to a digital asset, an embodiment of a database-based system only needs to commit the changed attributes to the database. This avoids rewriting the entire digital asset data file each time a change is made, improving performance.

Second, using a database allows for complex queries and modifications of digital assets. For example, users can select digital assets or components according to any criteria, including the values of any of their attributes. Once this set is selected, any attributes of the components of this set can be modified without instantiating the components into memory. If necessary, the set may be loaded into memory, instantiated, viewed, modified in any way, and stored back into memory without requiring any processing, manipulation, or instantiation of any other assets or components. With prior data file-based systems, performing a complex query would requiring opening and instantiating each digital asset and then comparing the instantiated digital asset with the search criteria.

Figure 1:
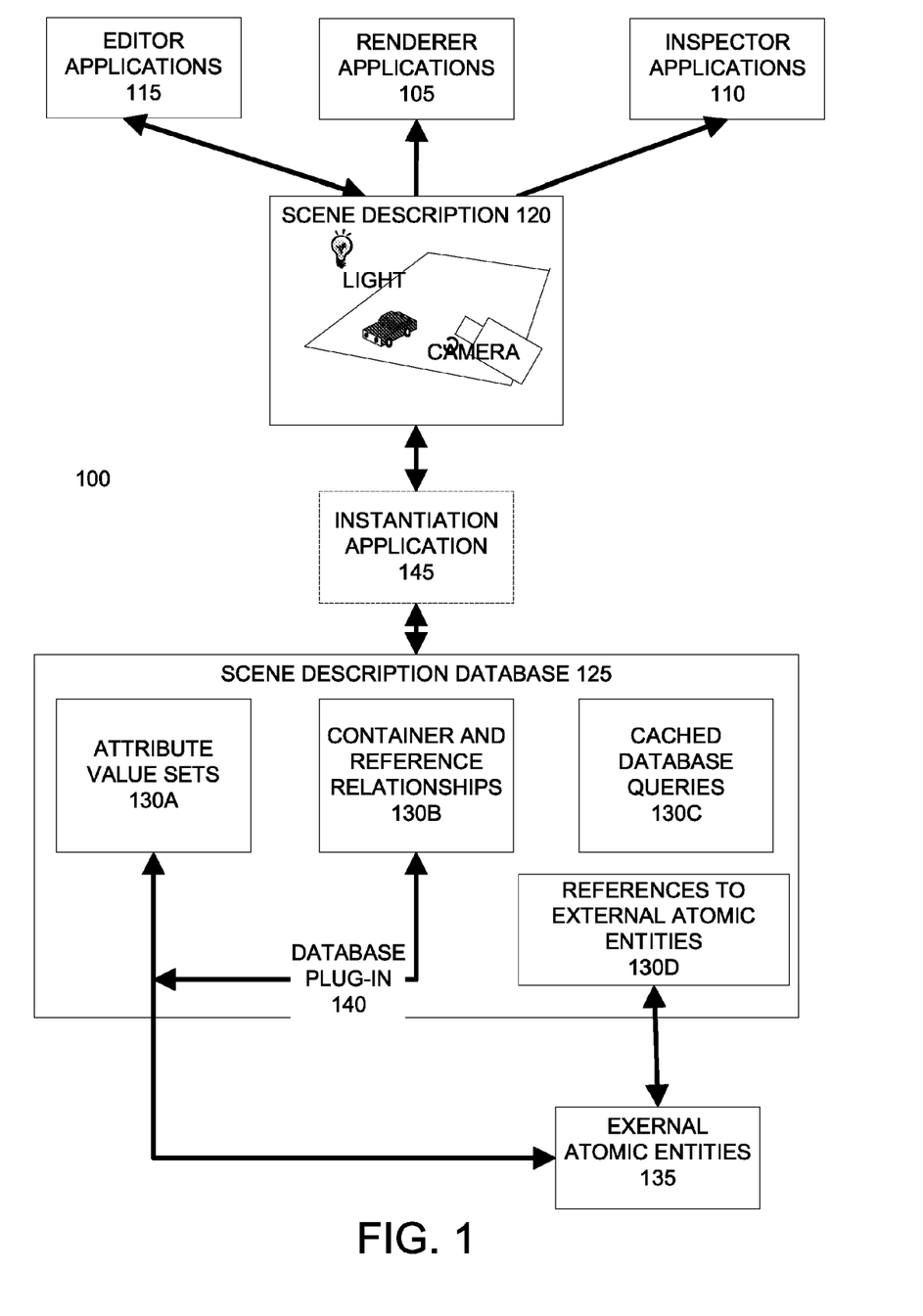
FIG. 1 illustrates a system for creating, modifying, and accessing components in a defined using a scene description database according to an embodiment of the invention.

FIG. 1 illustrates a system 100 for creating, modifying, and accessing components in a digital production pipeline according to an embodiment of the invention. However, applications of embodiments of the invention are not limited to system 100.

System 100 includes a number of applications for creating, viewing, modifying, and processing digital assets and their components. Examples of these applications include renderer applications 105, inspector applications 110, and editor applications 115. Renderer applications 105 are adapted to process components to create one or more images. Renderer applications 105 can utilize any rendering techniques or combinations of techniques known in the art, including ray casting and ray tracing, scanline rendering, rasterization, micropolygon-based or REYES rendering, volume rendering, and image-based rendering. Renderer applications 105 can produce images at interactive frame rates or at substantially slower rates depending upon the rendering technique, the available computing resources, and the desired degree of visual detail. Renderer applications 105 can also edit and combine sequences of animation.

Inspector applications 110 are adapted to present users with the state of one or more components. The state of components can include the values of one or more attributes. Attributes can define all aspects of a component, including whether the component itself is active, or is present, in a scene. In some applications, the association of a component or attributes thereof with one or more tasks is expressed as a task membership attribute, as described above. Additionally, the state of components can change over time within an animated sequence and at different points in the digital production pipeline. Inspector applications 110 may present state information of components in a number of different formats, including in the form of text, tables, timelines, charts, graphs, images, animations, and renderings from one or more viewpoints.

Editor applications 115 are adapted to create and modify the state of one or more components. Editor applications 115 can utilize interfaces adapted to manipulate data in the form of text, tables, timelines, charts, graphs, images, animations, and renderings from one or more viewpoints to create components and modify their attributes. Additionally, a user can input attribute values directly using any type or combination of input devices well known in the art, including keyboards, mice, and digitizer tablets. Additionally, editor applications 110 can analyze user input to indirectly set or modify one or more attribute values. For example, a user input could be processed by a filtering algorithm in an editor application to modify several attributes simultaneously in varying amounts.

Example applications 105, 110, and 115 can be combined into hybrid applications that perform inspector, editor, and/or renderer functions together. In an embodiment, system 100 includes an application programming interface enabling any additional applications to access and modify components.

An embodiment of system 100 includes an instantiated scene description 120. The instantiated scene description 120 includes an instantiation of the complete state of one or more components for at least one scene. This can include a component such as a model, a light, or a camera; articulation and animation data; a supporting component such as a texture map or a shader; or any combination of components. As discussed below, the instantiated scene description 120 instantiates the complete state of one or more components for one or more scenes. System 100 can instantiate components on instantiated scene description 120 for use at any point in the digital production pipeline. Components may take on different states, or augment their initial state with additional attributes, at different points of the digital production pipeline. Applications 105, 110, and 115 can create, access, and modify the state of components for one or more scenes via instantiated scene description 120.

An embodiment of system 100 stores and retrieves scene description such as digital assets, components, and their attributes from scene description database 125. Scene description database 125 stores data as a structured collection of data records. An embodiment of scene description database 125 stores digital assets, components, and their attributes directly in a database, without any association with a specific enclosing asset data file.

Embodiments of scene description database 125 may be implemented using any type of database model, including relational database models, hierarchical database models, and network database models. Scene description database 125 may store data records in volatile or non-volatile memory, or using persistent data storage such as magnetic or optical disks. Scene description database 125 may use any type of data storage structure for storing data records, including flat files, ISAM, heaps, hash buckets, and tree data structures such as B+ trees.

Scene description database 125 includes a number of data records representing scene description data 130. Examples of the types of scene description data 130 represented by data records in the scene description database 125 include attribute value sets 130a, container and reference relationship data 130b, cached database queries 130c, and reference data to external atomic digital assets 130d.

In an embodiment, each attribute value set 130a includes an attribute name or other identifier and one or more values associated with this attribute. An embodiment of system 100 allows attribute value sets 130a to store any type of data, including integers; floating point numbers; characters; strings; Boolean values; geometry data; compound data types such as vectors or tuples with two or more dimensions, matrices, arbitrary data structures, arrays, dictionaries, hash tables, and objects including data and methods.

In a further embodiment, an attribute value set may also store an atomic entity, which is a collection of binary or non-binary (e.g. text or XML) data stored as a single entity within the scene description database 125. Examples of atomic entities include images or textures of one or more dimensions, audio, video, other multimedia objects, shader, script, or executable code in source or object format, or proprietary data structures that cannot be parsed directly by the scene description database 125.

In an embodiment, the scene description database 125 may store a digital asset, component, or one or more attribute values as an atomic entity directly in the database. For example, an image may be stored as an atomic entity within the scene description database 125, rather than having separate database records for each individual pixel within the image. If access to individual pixels is requested, the image will likely be loaded into an image processing application for modification.

Embodiments of the scene description database 125 may be configured to store data as atomic entities by default or in response to commands, instructions, or configuration information provided by users or application. The decision to store data as an atomic entity as opposed to parsing the data into its constituent elements and storing each element separately in the scene description database 125 may be determined on a per entity basis, based on a type of the entity, or based on any other criteria. Generally, storing data as atomic entities results in faster database queries, at the expense of less control over searching and modification, less efficient data updates, and more expensive data instantiation.

In a further embodiment, the system 100 and scene description database 125 may be configured to access specific data elements within data stored as an atomic entity via an application programming interface to an external application. For example, an image is stored as an atomic entity within a database record in the scene description database 125. However, if the system 100 receives a query requesting pertaining to the contents of the image, such as the number of pixels having a specific color, then an embodiment of the system 100 directs an image processing application via an application programming interface or other inter-application communications technique to open the image from the database, perform any required analysis or processing of individual pixels, and to return any required results to the system 100.

In an embodiment, boundary between database data, which can be searched or modified directly using operations on scene description database 125, and atomic entity data, which must be accessed and modified via another application, may be invisible to end user or other applications accessing the system 100. For example, a system 100 may receive a request to identify all three-dimensional model meshes that have points attached to a specified deformer function and add a specified shader to these meshes. If the scene description database 125 includes separate data records for three-dimensional mesh data and for the points included in the mesh, this request can be satisfied by scene description database 125 using database queries and other database operations. In contrast, if the scene description database 125 stores three-dimensional model meshes as atomic entities within the scene description database 125, then an embodiment of system 100 converts this request into one or more accesses to a mesh editing application, which in turn analyzes and/or modifies the mesh data and returns result values to system 100. In this example, system 100 may then combine results from external applications with any results from database queries or other database operations to satisfy this request.

In an embodiment, container and reference relationship data 130b specifies a relationship between at least two of the attribute value sets 130a. Container and reference relationship data 130b may associate attribute value sets in one-to-one relationships, one-to-many relationships, many-to-one, and/or many-to-many relationships. In an embodiment, container and reference relationship data 130b may include a specification of a container relationship, which specifies a container or encapsulation of one or more of the attribute value sets 130a. For example, a first attribute value set may define a component and a second attribute value set may define an attribute value of this component. The associated container and reference relationship data specifies that the first attribute value set defining the component contains or encapsulates the second attribute value set specifying the attribute value of this component.

In an embodiment, container and reference relationship data 130b may include a specification of a cross-reference relationship. For example, a first attribute value set may specify that a second attribute value set be incorporated by reference. In a further example, if the second attribute value set is associated with a container relationship encapsulating one or more additional attribute value sets, then the first attribute value set will incorporate the container of the second attribute value set and its one or more additional attribute value sets.

In an embodiment, container and reference relationship data 130b may include a specification of an inheritance relationship. An inheritance relationship specifies that all or part of the data associated with a first attribute value set, potentially including one or more attribute value sets encapsulated by the first attribute value set, are inherited from at least a second attribute value set, potentially including one or more attribute value sets encapsulated by the second attribute value set.

Further embodiments of system 100 may specify other types of relationships in container and reference relationship data 130b, including digital asset, layer, and other types of container data relationships; network and dataflow relationships; dependency relationships; and namespace or other hierarchical relationships.

In an embodiment, scene description database 125 may include cache database query data 130c. Cached database query data 130c includes the results of one or more database queries. The cached database query data 130c may include attribute value sets 130a, container and reference relationship data 130b, and reference data to external atomic digital assets 130*d*. In an embodiment, cached database query data 130*c* may be generated and stored automatically by the scene description database in response to previously received database queries. In an embodiment, cached database query data 130*c* may be generated and stored in response to instructions, commands, or criteria, for example received from applications, users, configuration settings, or by default.

In an embodiment, upon receiving a database query from a user or an application, scene description database 125 compares the query to stored queries associated with cached database queries 130*c*. If the received query matches one of the stored queries, then an embodiment of scene description database 125 returns cached database query data 130*c* corresponding with the received query. Otherwise, scene description database 125 processes the received database query to determine a query result, which is returned and may also be added to the cached database query data 130*c*.

As discussed above, an embodiment of system 100 may store atomic entities as a single entity within the attribute value sets 130*a* without any association with a specific enclosing asset data file. However, in a further embodiment, some or all of the atomic entities may be stored external to the scene description database. In this embodiment, scene description database 125 includes references to external atomic digital assets 130*d*. The references to external atomic digital assets 130*d* specify storage locations of external atomic digital assets, for example as paths and file names in a file system. External atomic digital assets 135 are stored in a persistent data storage medium and can be accessed using the references to external atomic digital assets 130*c*. In still a further embodiment, references to external atomic digital assets 130*c* may include metadata summarizing the contents of external atomic digital assets 135.

In an embodiment, scene description database 125 includes an application programming interface or external module interface 140. Application programming interface may be used to add additional program modules to parse an external atomic entity, such as a proprietary data file, into its constituent elements and store each of these constituent elements separately in the scene description database 125 as attribute value sets 130*a*, container and reference relationship data 130*b*, and/or references to additional external atomic entities 130*d*, as well as one or more optional corresponding cached database queries 130*c*.

To determine the state of a component for one or more scenes, an embodiment of the system 100 generates and processes one or more queries of the scene description data. The results of this query or queries is scene description data specifying one or more attributes and associated values, one or more components, and/or one or more digital assets. An embodiment of system 100 reconstructs or instantiates components in memory using the query results to form the instantiated scene description 120. The instantiated scene description 120 may be created from query results by an application, such as renderer applications 105, inspector applications 110, and editor applications 115.

In a further embodiment, optional separate instantiation application 145 reconstructs or instantiates components using the query results to form the instantiated scene description 120. Other applications, such as renderer applications 105, inspector applications 110, and editor applications 115, may access the instantiated scene description 120 in memory via an application programming interface or other type of interface. Optional instantiation application 145 allows applications to access instantiated scene description without having knowledge of queries or the underlying scene description database 125. This allows older applications originally designed for data file based systems to be used in system 100 with minimal or no modification.

In an embodiment, applications may bypass the instantiated scene description 120 to access and modify scene description data in the scene description database directly. For example, an editor application 115 may issues a command to the scene description database 125 to select and modify attribute values meeting a given criteria.

Embodiments of scene description database 125 can use any type of internal representation of data records or database schema for storing scene description data 130, including attribute value sets 130*a*, container and reference relationship data 103*b*, cached database queries 130*c*, and references to external atomic entities 130*d*. For example, an attribute value set and its associated container and reference relationship data may be stored in a single data record of a database or in several related database records. Additional internal reference information, such as key values used to associate two or more records together, may be included in each data record. For example, key values in multiple data records may be used to define one-to-one, many-to-one, one-to-many, and many-to-many relationships between data records defining scene description data.

In an embodiment, scene description database 125 may be a relational database with several tables and specialized functions implementing the functionality described above. For example, it is difficult to select data records linked by hierarchical relationships in relational databases.

TABLE 1

Example Hierarchical Data Records
employee_managers

| emp_ref | manager_ref |
|---|---|
| oreo | graham |
| derose | graham |
| polson | osnat |
| graham | ec |
| ec | sjobs |
| osnat | sarahmc |
| sarahmc | sjobs |

Table 1 illustrates an example of hierarchical data stored as data records in a table of a relational database. In this example, some of the employees, identified by the value of the emp_ref column, have managers, identified by the value of the manager_ref column. In this example, the employee "graham" works directly under the employer "ec." Additionally, the employees "oreo" and "derose" work directly under the employee "graham." Thus, the employees "graham," "oreo," and "derose" work under (i.e. are in the hierarchy under) employee "ec."

An example SQL statement producing this result may be formatted as:

mgrtree_from_ec=hier_select(ec employee_managers
        emp_ref manager_ref)

In this example, the SQL function hier_select is a specialized function of the scene description database 125 adapted to select all of the data records under one or more specified data records at any level of a specified hierarchy. This function may be implemented natively by the scene description database 125, or as a SQL procedure. For example, table 2 lists example SQL pseudocode implementing the functionality of the SQL function hier_select as a SQL procedure.

TABLE 2

Example Hierarchical Selection SQL Pseudocode

```
CREATE PROCEDURE hier_select
    root table_name elem parent VARCHAR IN
    result TABLE OUT
AS
    INSERT result (elem parent level)
    VALUES root, NULL, 0
    //Hierarchy Level 1//
    INSERT result (elem parent level)
    SELECT t.elem, t.parent, 1
    FROM table_name t
    WHERE t.parent = result.elem
    //Hierarchy Level 2//
    INSERT result (elem parent level)
    SELECT t.elem, t.parent, 2
    FROM table_name t, result
    WHERE t.parent = result.elem
    //Similar for hierarchy levels 3 to N//
```

Hierarchical data records may be used by scene description database to represent container or encapsulation relationships; cross-reference relationships; inheritance relationships; layer relationships; network and dataflow relationships; dependency relationships; and namespace or other hierarchical relationships.

In an embodiment, scene description data 130 in scene description database may include opinion resolution and cross-referencing relationships. Components are specified using opinions of component attribute values. In an embodiment, opinions of value are grouped into opinion sets. Each opinion set includes an opinion of value for one or more attributes of one or more components. An opinion set may be sparsely populated with opinions of attribute values specifying only a portion of the attributes, properties, and/or relationship targets of one or more components. Many sparsely populated opinion sets may need to be combined to determine or resolve a complete specification of one or more components.

In an embodiment, two or more opinion sets may specify different opinions of value for the same attribute. In this embodiment, an opinion set order of resolution is used to determine the sequence of evaluation or resolution of component attribute values. The scene description data organizes opinion sets in an opinion set hierarchy. The opinion set hierarchy determines an order of resolution of opinion sets. The order of resolution specifies how the opinions of attribute values from two or more opinion sets specifying the properties and/or relationships of a component should be resolved to specify the complete state of the component.

For example, the opinions of value in a "stronger" opinion set may override the opinions of value in a "weaker" opinion. However, because opinion sets may be sparse, if a stronger opinion set does not specify any opinion of value for a given attribute, the opinion of value of this attribute expressed in a weaker opinion set will "pass through" the stronger opinion set and be included in the final resolved component.

In an embodiment, opinions of value for an attribute are expressed using the semantic structure associated with the attribute. In an embodiment, opinions of attribute values are resolved in the semantic structure of the associated attribute. For example, if two or more opinion sets include a first attribute that is a text string, a second attribute that is an integer, and a third attribute that is compound data structure, then the complete resolved state of the component will include the first attribute expressed as a text string, a second attribute expressed as an integer, and a third attribute expressed as the compound data structure. Unlike image processing and compositing applications, there is no need to convert data in opinion sets to a common format, such as pixels in an image, to resolve opinions of attribute values and determine the complete state of the component.

Moreover, opinion sets may be referred to as heterogeneous if they include data of many different types and/or many different structures. Furthermore, the type and structure of data may be different for each heterogeneous opinion set. Regardless of these differences, embodiments of the invention allow heterogeneous opinion sets to be resolved to determine the complete state of a component, expressed using the semantic structure of its attributes.

One example of heterogeneous opinion sets is the use of layering and cross-reference relationships. As described above, the order of resolution of opinion sets, such as layering data structures, enables attribute values of components to be selectively overridden without disturbing other attribute values. Additionally, cross-referencing relationships enable encapsulation and reuse of components. Cross-referencing relationships can encapsulate components defined by one or more opinion. One example application of opinion sets in conjunction with cross-referencing relationships is the use of layering and cross-reference relationships described in detail in U.S. patent application Ser. No. 11/738,953, which is incorporated by reference herein for all purposes.

The layer data structure enables the progressive refinement and incremental modification of components as needed. The cross-reference relationships to components enables the encapsulation and reuse of components. Together, this combination of layering and cross-referencing enables: data modification at any point of a collaborative workflow, in any order, without any loss of data in upstream or downstream activities of the workflow; unrestricted and progressive modification and refinement of components; unlimited branching and versioning of data at any point of the workflow; and a unified system of data specification and modification that enables any aspects of the data to be added, removed, reused, modified, or extended at any point of the workflow.

Figure 2:
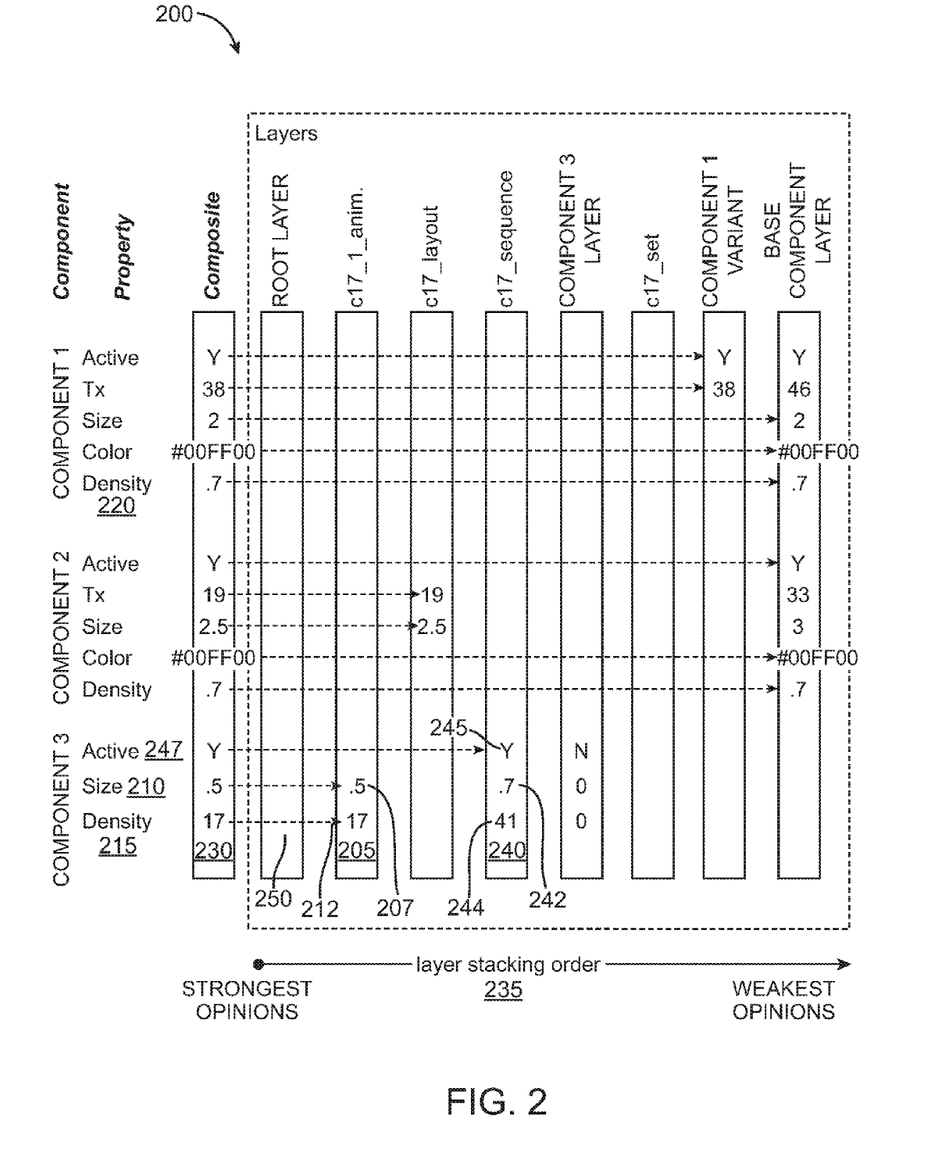
FIG. 2 illustrates a layers data structure specifying attributes of components according to an embodiment of the invention.

FIG. 2 illustrates a layers data structure 200 specifying attributes of components in one or more scenes according to an embodiment of the invention. In an embodiment, a component in one or more scenes is represented using one or more layers of a layer data structure. The layer data structure stores opinions of attribute values for a component. In this embodiment, each non-empty layer is adapted to include an opinion of the value of at least one attribute of at least one component. As discussed in detail below, each layer can override opinions of attribute values from weaker or lower-level layers.

Each layer may be sparsely populated—that is, a layer does not have to include every component in a scene and, moreover, a layer does not have to include opinions for the values of every attribute of any component. Each layer can specify an opinion of value for a new attribute of a component without having that attribute explicitly declared by a prior layer. A layer can include opinions of value for attributes of multiple components. Additionally, empty layers can be created in early stages of the digital production pipeline as placeholders for opinions of attribute values to be provided at later stages of the digital production pipeline.

In example layer data structure 200, layer 205 includes an opinion 207 that the position attribute 210 of component 3 should be set to a value of 0.5 and an opinion 212 that the direction attribute 215 of component 3 should be set to a value of 17. As can be seen in this example, the opinions of value of other attributes, such as the density attribute 220 of component 1 is undefined in layer 205.

In the above example, attribute values are numerical parameters. However, embodiments of layer data structure 200 allow the specification of any data type for an attribute value, including integers; floating point numbers; characters; strings; Boolean values; geometry data; compound data types such as vectors with two or more dimensions, matrices, structures, arrays, dictionaries, hash tables, elements of edit decision lists; references to one or more components; references to one or more layers; references to elements, tables, or other structures of a database; and references to internal or external functions, scripts, or executable programs.

Layers provide opinions of value for attributes of components in terms of the semantic structure associated with the components. Any arbitrary abstract attribute of a component can be expressed in a layer. Furthermore, one or more layers can provide opinions of value for the attribute of a component in the unique terms or semantic structure defined for that attribute. There is no need to reduce opinions of value of abstract attributes to a common or low-level form, such as pixels or points, to resolve the values.

For example, a first layer can specify a model of a character wearing a hat. One attribute of the hat could be its type, such as "sombrero." Thus, the first layer could set a "hat type" attribute of the component to a value of "sombrero." Thus, from the view of the first layer, the character model should have a sombrero. A second layer that is higher or stronger than the first layer could change the hat type attribute of the component from "sombrero" to "top hat." Thus, from the view of the second layer, the character model should have top hat. A third layer that is higher or stronger than the second layer could specify that a color attribute of the hat should be "purple" and a material attribute should be "felt." Thus, from the view of the third layer, the character should have a purple felt top hat. In this example, each layer expresses an opinion of one or more attribute values in terms of the semantics associated with each attribute.

Furthermore, a component may include a reference to another component defined by one or more layers. For example, a Hat component of a character model can be a reference to a specific model of a hat. Thus, when reference is set to a "sombrero" component, the character model includes a model of a sombrero. When the reference is overridden by a layer to a "top hat" component, the character model is changed to include a model of a top hat. Each of these models can be defined by one or more layers, the attributes of which can be wholly or partially or overridden by other layers as described above.

In an embodiment, every layer in the digital production pipeline is associated with one or more tasks or activities. Users can create and manipulate layers manually to provide additional control and ease of use for a component. For example, the attributes of different models can be specified in separate layers. In another example, related attribute values for different models in a scene can be specified in the same layer to facilitate easy manipulation. In an embodiment, applications associated with activities can automatically create, access, and modify layers based on context, such as the activity, the type of component, and the action being performed by the user.

The complete authored state of one or more components in one or more scenes at a given point of the digital production pipeline is determined by resolving all of the layers associated with a given point to produce a resolved layer 230. The resolved layer 230 includes opinions of attribute values for the attributes specified by one or more of the associated layers. The resolved layer 230 can also be referred to as a resolve scene description.

In an embodiment, a layer stacking order 235 determines the order in which layers are resolved. This in turn specifies how attribute values in one layer override corresponding attribute values in other layers. In an embodiment, layers are assigned a strength in absolute or relative terms. For example, a first layer can include a relative strength value indicating that it is stronger than or weaker than one or more other layers. In this embodiment, opinions of attribute values in stronger layers will be at the "top" of the stacking order and will override opinions of attribute values in weaker layers, i.e. layers that are "lower" in the stacking order. The example layer stacking order 235 is a linear order; however, more complicated layer stacking orders with multiple branches can be utilized. In an embodiment, layer stacking orders can be set or modified by digital production pipeline applications, either manually by a user or automatically by applications. In a further embodiment, the strength of layers is defined at least in part with respect to a root layer, such as root layer 250, which is by default the strongest or highest level layer.

In example layer data structure 200, layer 240 includes opinions 242 and 244 of the value of attributes 210 and 215. However, stacking order 235 places layer 205 as stronger than or ahead of layer 240. Thus, in the resolved layer 230, the opinions of value 207 and 212 of layer 205 for attributes 210 and 215 will override corresponding opinions 242 and 244 in layer 240. However, as layer 205 does not define an opinion of value for attribute 247 of component 3, the opinion 245 in layer 240 will define the value of attribute 247 in the resolved layer 230.

Figure 3:
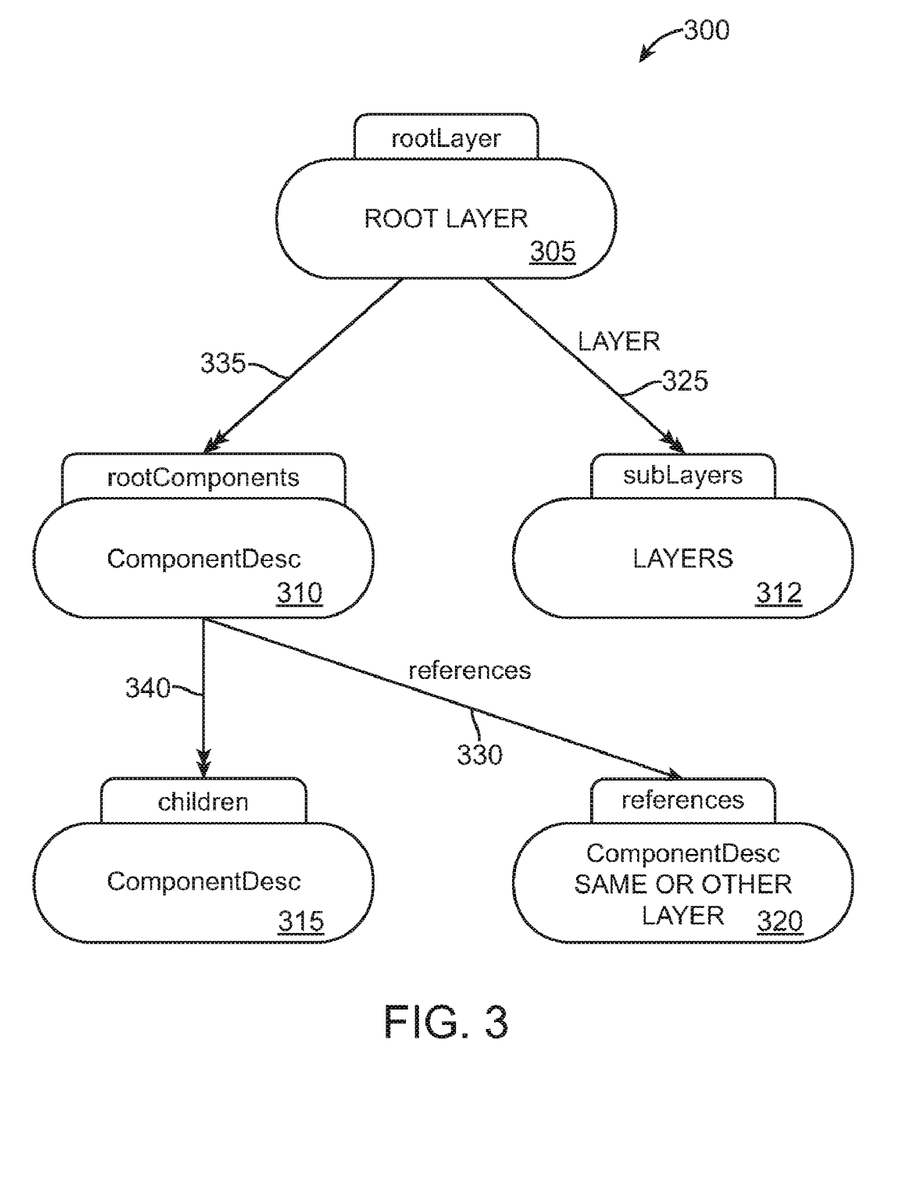
FIG. 3 illustrates a scene description data structure representing the state of a component according to an embodiment of the invention.

FIG. 3 illustrates a scene description data structure 300 representing the authored state of components in one or more scenes according to an embodiment of the invention. The authored state is the set of attribute values apart from any default or application-provided fallback attribute values for one or more components. The scene description data structure 300 specifies a graph or set of relationships between components as well as layer data structures specifying opinions of attribute values of components for one or more scenes. For a graph of relationships, components and layer data structures are referred to generally as nodes. The scene description data structure 300 may be instantiated or reconstructed in memory for use by users and applications.

In an embodiment, the scene description data structure 300 combines two different aspects: a layer data structure, as described above, and cross-references to components. As described above, the layer data structure enables the progressive refinement and incremental modification of components as needed and the cross-references to components enables the encapsulation and reuse of components. Together, this combination of layering and cross-referencing enables: data modification at any point of a collaborative workflow, in any order, without any loss of data in upstream or downstream activities of the workflow; unrestricted and progressive modification and refinement of components; unlimited branching and versioning of data at any point of the workflow; and a unified system of data specification and modification that enables any aspects of the data to be added, removed, reused, modified, or extended at any point of the workflow.

In an embodiment, scene description data structure 300 specifies the relationships between components and layer data structures, which express opinions of component attribute values, in a hierarchical graph structure. Nodes of scene description data structure 300 may correspond with components, such as data representing geometry, texturing, shading, articulation, animation, simulation, layout, lighting, or rendering, or with layer data structures.

In an embodiment, the hierarchical graph structure includes three different types of relationships between components and layers: namespace relationships, layer relationships, and reference relationships. Namespace relationships establish the namespace or other nomenclature used to identify and organize components. Namespace relationships are used to assign components' identities, to match up components from different layers that should override each other, and to provide the scope of inclusion for references. Alternative embodiments can utilize other attributes, such as globally unique identifiers (GUIDs), to arrange components and layer data structures within the scene description data structure.

Layer relationships specify the relationship between a layer data structure and one or more sublayers. Layer relationships specify the layer stacking order used to resolve or combine layers to determine attribute values of components.

Reference relationships provide links to components specified elsewhere. A reference relationship from a first component in a first layer data structure can reference a second component defined in the same layer data structure, a second component in another layer data structure associated with the first layer data structure, or a second component in another layer data structure that is not associated with the first layer data structure. Implementations of reference relationships can be restricted to directly referencing only the root component in another layer data structure (with any child components referenced implicitly using namespace relationships associated with the root component) or alternatively can be unrestricted to allow direct referencing of any arbitrary component in another layer data structure.

In an embodiment, the scene description data structure 300 includes a root layer 305 for the scene. In an embodiment, the relationships of the hierarchical graph between components and layer data structures are specified, at least in part, by root layer 305. Child nodes, such as root component 310 and sublayers hierarchy 312 can be directly associated with the root layer 305.

In an embodiment of the hierarchical graph, each non-empty layer data structure, including the root layer 305, includes at least one root component, such as root component 310. Additional components within the layer data structure are associated as child nodes (or grandchild or other descendant nodes) of the root component. As an example of this embodiment, one or more additional components 315 are associated via namespace relationships 340 as descendant nodes of root component 310.

In an embodiment, the namespace relationships 340 between component nodes in a layer are specified in the form of relationship attributes of components. For example, component 315 can include a parent attribute, which would be set to reference component 310. In another embodiment, a component can include a child relationship attribute specifying one or more child components of the component. For example, root component 310 can include a child relationship attribute, which would be set to reference components 315.

In an embodiment of the hierarchical graph, each additional layer data structure of the scene description data structure is a descendant, or sublayer, of the root layer. As an example of this embodiment, the root layer 305 is associated with one or more additional layer data structures 312 via layer relationships 325. In an embodiment, the arrangement of layer data structures 312 relative to the root layer 305 and each other specifies the layer stacking order used to combine and override opinions of component attribute values to form the resolved layer. Although omitted for clarity, in an embodiment of the scene description data structure, each additional layer data structure that is not empty includes its own root component, similar to root component 310. Furthermore, sublayers can include additional components associated with their respective root components via namespace relationships.

In a further embodiment, reference relationships, such as reference relationship 330, provides a link to one or more components specified elsewhere. A reference relationship from a first component in a first layer data structure can reference a second, target component 320 defined in the same layer data structure, in another layer data structure associated with the first layer data structure, or in another layer data structure that is not associated with the first layer data structure. Implementations of reference relationships 330 can be restricted to target only the root component in another layer data structure (with any child components referenced implicitly) or alternatively can be unrestricted to directly referencing any arbitrary target component in another layer data structure.

In an embodiment, the graph, or set of relationships between components and layers, defined by the scene description data structure 300 can be orthogonal, or completely independent, of any other optional graphs associated with the same components. Graphs can be used to define different sets of relationships for the same components in different scenes. For example, a second scene description data structure can be created to specify different relationships between components for additional scenes. Additional layers included in the second scene description data structure can further specify different attribute values for the components.

In an embodiment, relationship attributes of components can also specify functional relationship between components. For example, relationships between coordinate transformation components can specify a specific sequence for applying transformations to models. In a further embodiment, relationship attributes can include additional data defining some parameter of a relationship. For example, a light source component can be related to a first model component, which indicates that the light source component provides light to the model component. The lighting relationship between these two components can further include a light intensity value to indicate the intensity of light from the light source on the first model. If a second lighting relationship is created between the light source component and a second model component, the second lighting relationship can include a different light intensity value.

In an embodiment, system 100 specifies scene description data 130 in terms of attributes and relationship in layers and layer hierarchies. In this embodiment, attribute value sets 130a are stored in scene description database 125. One or more layers encapsulating attribute value sets 130a are defined as containers and stored as part of the container and reference relationship data 130b in the scene description database 125. Additionally, layer relationships 335 defining one or more layer stacking orders between layers are also defined as part of the container and reference relationship data 130b. Container and reference relationship data 130b also includes cross-reference relationships 330 and namespace relationships 340, as well as any other types of relationships between components.

In this embodiment, an application, such as applications 105, 110, and 115, or an optional instantiation application 145, uses database queries to retrieve one or more layers from the scene description database 125. Layers retrieved from the scene description database 125 may include attribute value sets and associated container and reference relationship data 130b defining components and digital assets. These attribute value sets and the associated container and reference relationship data may also be retrieved as needed using database queries. The application also retrieves one or more layer stacking orders from the scene description database 125 using database queries, or uses an implicit or explicit layer stacking order specified with another data source. Using a layer stacking order, an application resolves the retrieved layers and resolves cross-references, as described by FIG. 2, to define scene description data, in a form similar to scene description data structure 300, representing the components and digital assets defined by the data retrieved from scene description database 125. The scene description data can then be instantiated to form instantiated scene description 120 in memory for use by one or more applications.

TABLE 3

Example Layer Resolving SQL Pseudocode

```
CREATE PROCEDURE get_resolved
    hookname VARCHAR in
    hookparams TABLE IN
    result TABLE OUT
    AS
        for each param in Foo_hookparams
            ## note: these are sorted by value
            ## so we see the lowest value first
            INSERT result ( hookname, param, value )
            skip
#end procedure get_resolved
#resolve layers example
# get all hook parameters for shot

    CREATE VIEW a1_1_hookparams
        (uses crosslink table, etc.)
# get a table of the class structure
# so we can order the hook params by resolution level

    CREATE VIEW a1_1_hookclasses
        (uses a1_1_hookparams)
# get the subtree for Foo_Deluded

    Foo_hookclasses = hier_select( "Foo_Deluded", etc.)
# get the subset of hookparams belonging to Foo_Deluded
# with level ordering info from the hookclass subtree above

    CREATE VIEW Foo_hookparams
        (uses Foo_hookclasses, a_1_1_hookparams)
# take the param with minimal level -- toss the rest
# and you've got layer resolution

    Foo_resolved = get_resolved( "Foo_Deluded",
Foo_hookparams )
```

As described above, different layers can be specified in different portions of a workflow and/or by different users, enabling data to be revised or refined without the need for explicit change isolation or versioning and without destroying the data previously specified in weaker layers. This allows an independent variation of the data to be created and used without affecting the usage elsewhere of either the original data or any other variation of the same data. Moreover, because layers can express opinions of value for any attribute of data, there are no restrictions on the type or extent of modifications permitted on referenced data. Furthermore, if the data includes reference relationships to all or a portion of a layer data structure, other data may be encapsulated, reused, and optionally modified by any other data at any point in the workflow.

Although the above described systems and methods have been described with reference to components, digital assets, and digital production pipelines, the scene description data structure and its layering and referencing relationships can be generalized for use with applications and data of any type stored in a database, including text and word processing data; spreadsheet data; database tables and objects; engineering blueprints, schematics, and specifications; and object-orientated data structures. The generalized forms of these data structures and the above-described methods of manipulating these data structures are particularly useful in non-linear workflows. Nonlinear workflows can include collaborative working environments in which multiple users work on the same data. Nonlinear workflows can also enable one or more users to generate multiple variations of the data at any arbitrary point of the workflow without destroying data associated with previous or subsequent portions of the workflow. For example, a user could use the above described systems and methods to create multiple financial scenarios within a spreadsheet application based on a common set of initial conditions.

Figure 4:
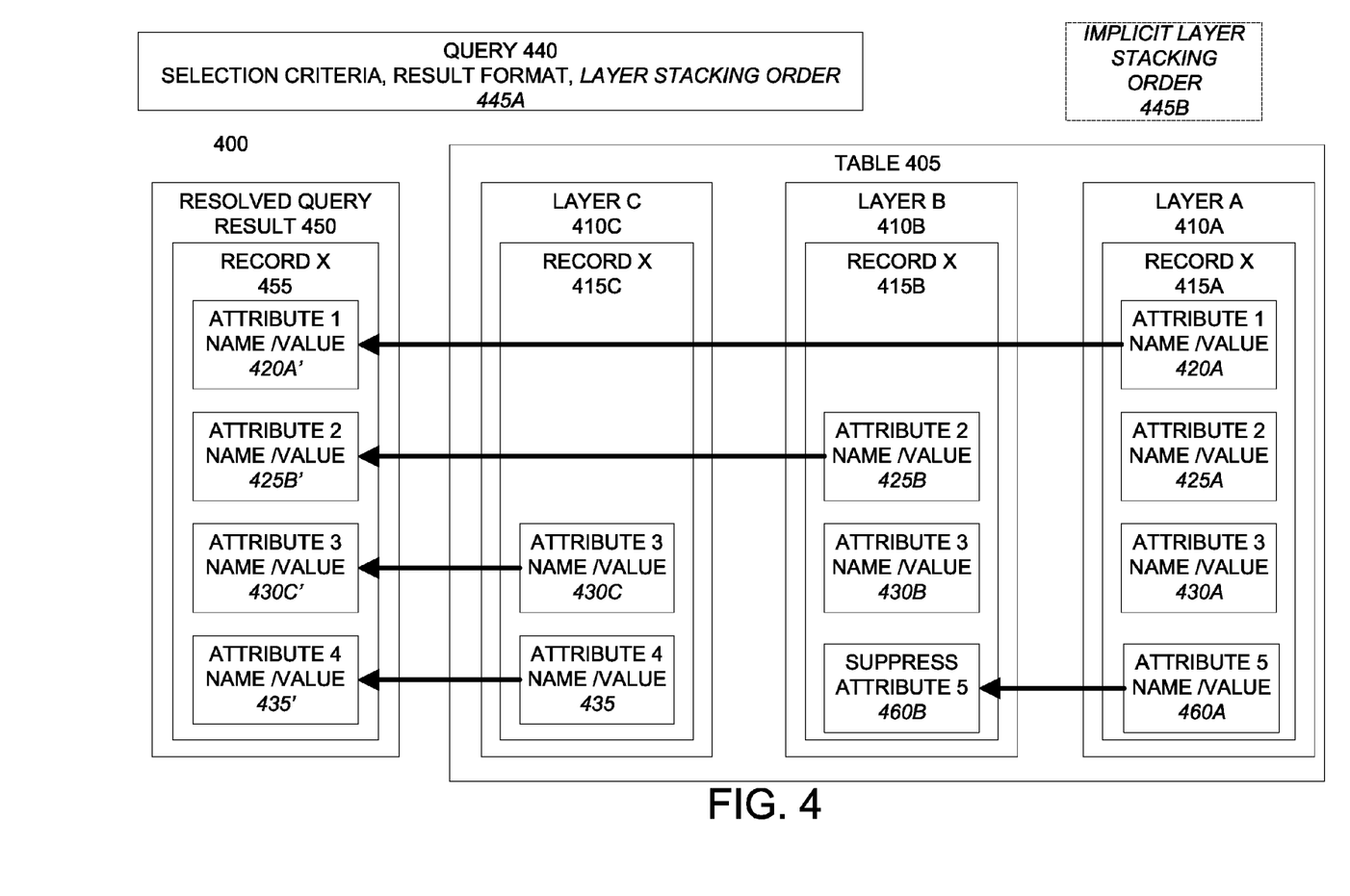
FIG. 4 illustrates an example application of layering in a general database application according to an embodiment of the invention.

FIG. 4 illustrates an example application 400 of layering in a general database application according to an embodiment of the invention. Example application 400 includes a database table 405 of a relational database. Unlike typical relational database tables, table 405 includes a number of separate layers 410, including layer A 410a, layer B 410b, and layer C 410c. In an embodiment, table 405 may include any arbitrary number of layers. Furthermore, an embodiment of table 405 may be implemented with a database schema in such as way as to allow additional layers to be added at any time without substantial overhead.

Each of the layers 410 includes one or more data records 415, including for example data record X 415a in layer A 410a and corresponding data records X 415b and 415c in layers B 410b and C 410c, respectively. In an embodiment, layers 410 of table 405 may be sparsely populated with data records 415. In this embodiment, if one layer includes a data record, the other layers do not need to include a corresponding version of this data record.

Each of the versions of data record X 415 in the different layers 410 includes one or more attributes and values. For example, record X 415a in layer A 410a includes attribute and value set 1 420a, attribute and value set 2 425a, and attribute and value set 3 430a. Similarly, record X 415b in layer B 410b includes attribute and value set 2 425b and attribute and value set 3 430b. Record X 415c in layer C 410c includes attribute and value set 3 430c and attribute and value set 4 435.

In this example, data records are sparsely populated with attribute and value sets. If one data record in one layer includes an attribute and value set, a corresponding version of the data record in another layer does not have to include this attribute and value set. Furthermore, an embodiment of table 405 may be implemented with a database model and/or schema in such as way as to allow additional attribute and value sets to be added to data records at any time without substantial overhead. For example, data record X 415c in layer C 410c includes attribute and value set 4 435, even though this attribute and value set is not defined in any other layer for this data record.

In the example 400, a database query 440 includes a selection criteria specifying the characteristics of data records to be retrieved from table 405 and optionally a result format specifying the arrangement of any data records selected from the table 405. In an embodiment, the database query may optionally include a layer stacking order 445a explicitly selecting all or a portion of the layers 410 of the table 405 to be considered in processing the database query 440 and the order that the selected layers should be resolved. Alternatively, a database query 440 may omit the layer stacking order 445a and instead rely on a implicit layer stacking order 445b. Embodiments of the implicit layer stacking order 445b include layer stacking orders specified directly or based on criteria defined by default, in response to commands, instructions, or configuration information from users or applications, and/or attributes of the layers themselves and stored in the database.

In response to a database query 440 and a layer stacking order 445, an embodiment of example 400 returns a resolved query result 450. The resolved query result 450 includes the data records selected by the selection criteria of the database query 440 and then resolved according to the appropriate layer stacking order 445. For example, if the layer stacking order 445 used with database query 440 specifies that layer C 410*c* is stronger than layer B 410*b* and layer B 410*b* is stronger than layer A 410*a*, then the resolved query result 450 shown in FIG. 4 will result.

Resolved query result 450 includes a resolved version of record X 455. Resolved record X includes a copy 420*a*' of attribute and value set 1 420*a* from layer A 410*a*. Resolved record X includes a copy 425*b*' of attribute and value set 2 425*b* from layer B 410*b*, overriding the attribute and value set 2 425*a* from layer A 410*a*. Resolved record X includes a copy 430*c*' of attribute and value set 3 430*c* from layer C 410*c*, overriding the attribute and value sets 3 430*a* and 430*b* from layers A 410*a* and B 410*b*. Resolved record X also includes a copy 435' of attribute and value set 4 435 from layer C 410*c*.

In this embodiment, the schema or structure of attributes and values in a resolved data record is not fixed. Rather, the set of attributes and values included in a resolved data record is dependent on the layers of the table included in the query. For example, if a first database query requests database record X 415 and selects layer A 410A and layer B 410B, the resulting composited query result will be a first resolved instance of data record X that includes attribute 1 420, attribute 2 425, and attribute 3 430. In this example, the schema or structure of first resolved instance of data record X will not include attribute 4 435; for the first resolved instance of data record X, attribute 4 435 is undefined and does not exist in the first resolved instance of data record X.

Continuing with this example, if a second database query also requests database record X 415 and selects layer B 410B and layer C 410C, the resulting composited query result will be a second resolved instance of data record X that includes attribute 2 425, attribute 3 430, and attribute 4 435. In this example, the schema or structure of second resolved instance of data record X will not include attribute 1 420; for the second resolved instance of data record X, attribute 1 420 is undefined and does not exist. Thus, the structure of data, or schema, within a resolved data record may change depending upon the combination of layers selected by the query.

In a further embodiment, attribute and value sets from one layer may be suppressed by an attribute and value set from a stronger layer, such that the resolved version of the record does not include a given attribute value set. For example, record X 415*a* in layer A 410*a* includes an attribute and value set 460*a*. Record X 415*b* in layer B 410*b* includes an attribute suppression indicator 460*b* corresponding with attribute and value set 460*a*. During the data record solution processing, the attribute suppression indicator 460*b* will override the existence of attribute and value set 460*a*. As a result, the resolved query result 450 does not include any attribute and value set corresponding with attribute and value set 460*a*.

In an embodiment, layering and resolving may be implemented as native capabilities within the data structures and functionality of a database. In another embodiment, a table with layering functionality as shown in example 400 may be implemented using specialized database schema and query procedures on non-layered database tables. For example, table 400 may implement layering as a field or an attribute in an additional column of a data record. To implement a layered query, a database procedure may issue one or more database queries to select data records associated with each layer. The database procedure may then issue further database queries on the data records of each layer to resolve data records according to a layer stacking order, resulting in a resolved query result. In this example, applications may view the database as natively providing layering functionality. Database application programming interfaces and database procedures translate layered database queries and commands into equivalent non-layered database commands.

Figure 5:
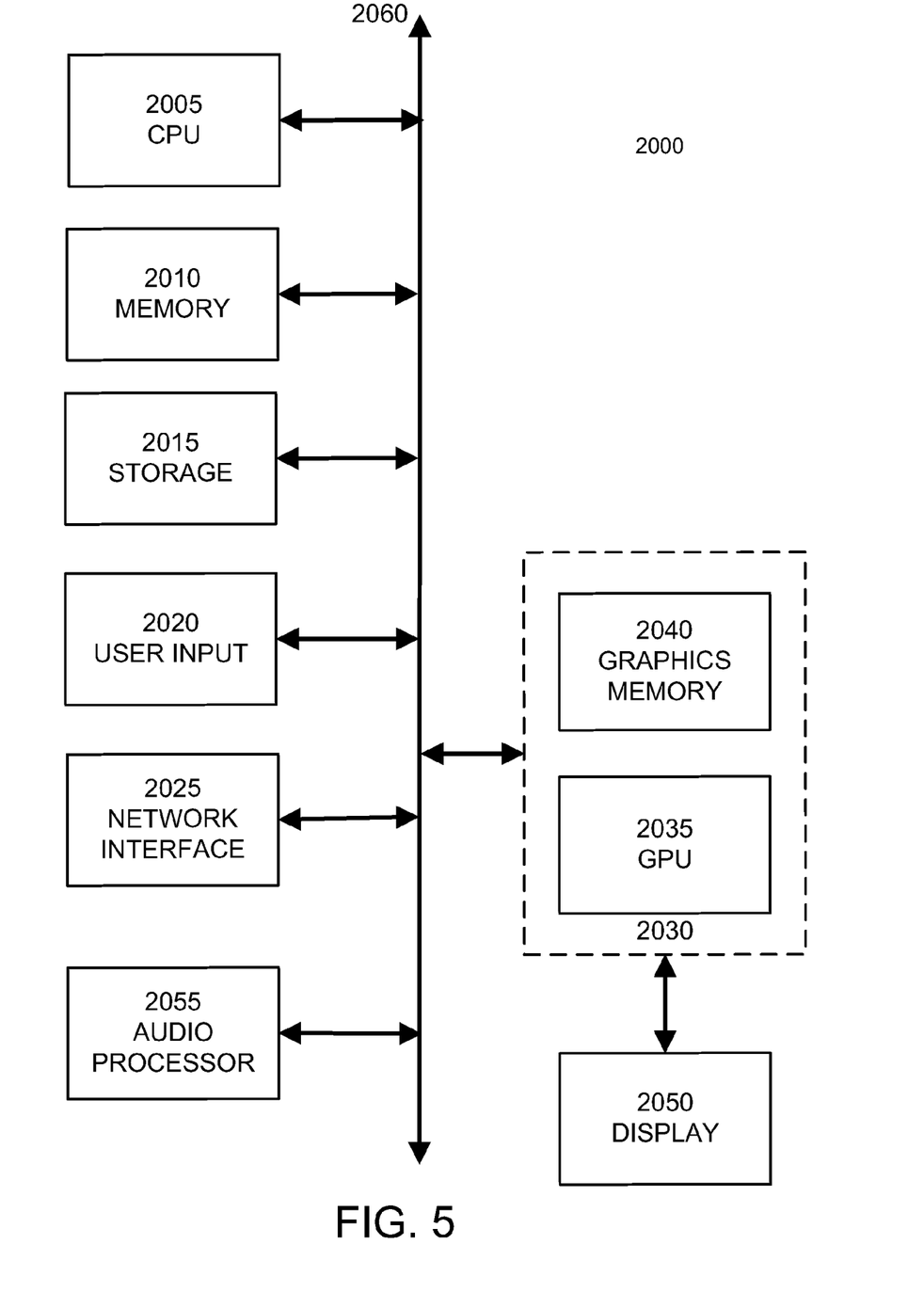
FIG. 5 illustrates a computer system suitable for implementing an embodiment of the invention.

FIG. 5 illustrates a computer system suitable for implementing an embodiment of the invention. FIG. 5 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of instantiating scene components of computer graphics scenes by processing a database query, the method comprising:
    receiving, at one or more computer systems, a database query including selection criteria;
    determining, with one or more processors associated with the one or more computer systems, an opinion resolving order that specifies an order of resolution of heterogeneous opinion sets grouping one or more component attribute value opinions for one or more component attributes;
    selecting, with the one or more processors associated with the one or more computer systems, data records representing atomic elements of scene components from a database based on the selection criteria, wherein each of the selected data records is associated with a component attribute, a component attribute value opinion, and one of the heterogeneous opinion sets; and
    resolving, with the one or more processors associated with the one or more computer systems, the selected data records to determine a resolved query result, wherein the resolution of the selected data records is based on the order of resolution and each heterogeneous opinion set associated with the selected data records; and
    generating, with the one or more processors associated with the one or more computer systems, a scene description data structure based on the resolved query result.

2. The method of claim 1, comprising:
    outputting the scene description data structure to an application.

3. The method of claim 1, wherein the database is a relational database.

4. The method of claim 1, wherein each of the selected data records includes a field specifying an association with one of the heterogeneous opinion sets.

5. The method of claim 1, wherein the database query includes the order of resolution.

6. The method of claim 1, wherein an implicit order of resolution determines the order of resolution.

7. The method of claim 6, wherein the implicit order of resolution is specified directly as an ordered list of heterogeneous opinion sets.

8. The method of claim 6, wherein the implicit order of resolution is based on at least one criterion provided from a group consisting of:
    a default criterion; a command or instruction; configuration information; user specified information; application specified information; at least one attribute defined within data records from a database; and at least one attribute of at least one of the set of heterogeneous opinion sets.

9. The method of claim 8, wherein a data record of the database includes the at least one attribute of at least one of the heterogeneous opinion sets.

10. The method of claim 1, wherein resolving the selected data records to determine the resolved query result comprises:
    identifying, with the one or more processors associated with the one or more computer systems, a first one of the selected data records associated with a first component attribute and a first heterogeneous opinion set;
    identifying, with the one or more processors associated with the one or more computer systems, a second one of the selected data records associated with the first component attribute and a second heterogeneous opinion set;
    determining, with the one or more processors associated with the one or more computer systems, from the order of resolution whether the second heterogeneous opinion set is stronger than the first heterogeneous opinion set;
    in response to a determination that the second heterogeneous opinion set is stronger than the first heterogeneous opinion set, including the second one of the selected data records in the resolved query results; and
    in response to the determination that the second heterogeneous opinion set is stronger than the first heterogeneous opinion set, including, with the one or more processors associated with the one or more computer systems, the first one of the selected data record in the resolved query result.

11. The method of claim 1, wherein resolving the selected data records to determine the resolved query result comprises:
    identifying a first one of the selected data records associated with a first component attribute and a first heterogeneous opinion set;
    determining that the first component attribute is specified by the selected data records in one of the heterogeneous opinion sets in addition to the first heterogeneous opinion set;
    in response to the determination that the first component attribute is not specified by the selected data records in one of the heterogeneous opinion sets in addition to the first heterogeneous opinion set, including, with the one or more processors associated with the one or more computer systems, the first selected data record in the resolved query result.

12. The method of claim 11, wherein the order of resolution specifies that the first heterogeneous opinion set is a weakest heterogeneous opinion set.

13. The method of claim 11, wherein the order of resolution specifies that the first heterogeneous opinion set is not a weakest heterogeneous opinion set.

14. The method of claim 1, wherein resolving the selected data records to determine the resolved query result comprises:
   identifying a first one of the selected data records associated with a first component attribute, a second component attribute, and a first heterogeneous opinion set;
   identifying a second one of the selected data records associated with the first component attribute and a second heterogeneous opinion set that is stronger than the first heterogeneous opinion set;
   determining whether the second one of the selected data records includes a suppression indicator associated with the first component attribute;
   in response to a determination that the second one of the selected data records does not include the suppression indicator associated with the first component attribute, including, with the one or more processors associated with the one or more computer systems, the first component attribute and the second component attribute in the resolved query result; and
   in response to a determination that the second one of the selected one or more data records includes the suppression indicator associated with the first component attribute, excluding the first component attribute and including the second component attribute in the resolved query result.

15. The method of claim 10, wherein the first one of the selected data records is arranged according to a first data schema and the second one of the selected data records is arranged according to a second data schema, wherein:
   in response to the determination that the second heterogeneous opinion set is stronger than the first heterogeneous opinion set, the resolved query result includes the second data schema; and
   in response to the determination that the second heterogeneous opinion set is not stronger than the first heterogeneous opinion set, the resolved query result includes the first data schema.

16. A method of generating a hierarchy of scene components of a scene in a computer memory, the method comprising:
   receiving at least one scene description query;
   retrieving scene description query results from a scene description database including scene description data records in response to the at least one scene description query, wherein the scene description query results include scene description attribute-value pair sets, scene description relationship data, heterogeneous opinion set data, and an order of resolution;
   receiving information associating scene description attribute value sets and scene description relationship data with heterogeneous opinion sets defined by the heterogeneous opinion set data;
   resolving the heterogeneous opinion sets to generate a scene description data structure specification from the scene description query results, wherein the resolution of the heterogeneous opinion sets is based on the order of resolution; and
   generating, with the one or more processors associated with the one or more computer systems, a scene description data structure in a computer memory from the scene description data structure specification.

17. The method of claim 16, wherein the scene description relationship data defines at least one relationship type selected from a group consisting of:
   a container relationship; a cross-reference relationship; an inheritance relationship; a network relationship; a dataflow relationship; a dependency relationship; a namespace relationship; and a hierarchical relationship.

18. The method of claim 16, wherein the scene description query results include a cached query result.

19. The method of claim 16, comprising:
   receiving a modification of the scene description data structure;
   generating at least one database update operation based on the modification; and
   providing the database update operation to the scene description database to modify at least a portion of the scene description database records.

20. The method of claim 16, comprising:
   receiving a database update operation specifying a modification of the scene description query results;
   providing the database update operation to the scene description database to modify at least a portion of the scene description database records; and
   updating the instantiated scene description data structure in the computer memory from the modification of the scene description query results.

21. The method of claim 20, wherein updating the instantiated scene description data structure comprises:
   re-providing the scene description query to the scene description database including the modified scene description data records;
   receiving modified scene description query results;
   generating a modified scene description data structure specification from the modified scene description query results; and
   re-instantiating the scene description data structure in the computer memory from the modified scene description data structure specification.

22. The method of claim 16, further comprising:
   rendering at least one image from the instantiated scene description.

23. The method of claim 16, further comprising:
   providing access to the instantiated scene description in the computer memory to an application via an application programming interface.

24. The method of claim 16, wherein resolving the heterogeneous opinion sets comprises:
   resolving cross-reference relationships associated with the attribute value sets.

25. The method of claim 16, wherein resolving the heterogeneous opinion sets comprises:
   resolving inheritance relationships associated with the attribute value sets.

26. A method of instantiating a component by processing a database query, the method comprising:
   receiving, at one or more computer systems, a database query including selection criteria; receiving, at the one or more computer systems, an opinion resolving order that specifies an order of resolution of heterogeneous opinion sets;

selecting, with the one or more processors associated with the one or more computer systems, data records from a database based on the selection criteria, wherein each of the selected data records is associated with an elemental attribute of the component, an attribute value opinion; and one of the heterogeneous opinion sets;

identifying, with the one or more processors associated with the one or more computer systems, a first one of the selected data records including an association with a first attribute, a first attribute value opinion, and a first heterogeneous opinion set;

identifying, with the one or more processors associated with the one or more computer systems, a second one of the selected data records including an association with a second attribute, a second attribute value opinion, and a second heterogeneous opinion set, wherein the first one of the selected data records does not include the second attribute;

resolving, with the one or more processors associated with the one or more computer systems, the selected data records based on the order of resolution and the associated heterogeneous opinion set of each of the selected data records, to determine a resolved query result including a resolved data record including the first attribute set with a value associated with the first attribute value opinion and the second attribute set with a value associated with the the second attribute value opinion; and instantiating, with the one or more processors associated with the one or more computer systems, the component at a first state that includes the first attribute set at the first attribute value opinion and the second attribute set at the second value opinion.

27. The method of claim 26, comprising:
outputting the resolved query result to an application.

28. The method of claim 26, wherein the database is a relational database.

29. The method of claim 26, wherein each data record includes a field specifying an association with one of the heterogeneous opinion sets.

30. The method of claim 26, wherein the database query includes the order of resolution.

31. The method of claim 26, wherein an implicit order of resolution determines the order of resolution.

32. The method of claim 31, wherein the implicit order of resolution is specified directly as an ordered list of heterogeneous opinion sets.

33. The method of claim 31, wherein the implicit order of resolution is based on at least one criterion provided from a group consisting of:
a default criterion; a command or instruction; configuration information; user specified information; application specified information; at least one attribute defined within data records from a database; and at least one attribute of at least one of the set of heterogeneous opinion sets.

34. The method of claim 26, wherein selecting data records from the database based on the selection criteria comprises:
determining if one of the selected data records includes an atomic data entity; and
accessing the atomic data entity using an application adapted to access the atomic data entity.

35. A method of instantiating a component by processing a database query, the method comprising:
receiving, at one or more computer systems, a database query including selection criteria;
determining, with one or more processors associated with the one or more computer systems, an opinion resolving order that specifies an order of resolution of heterogeneous opinion sets grouping one or more component attribute value opinions for one or more component attributes;

selecting, with the one or more processors associated with the one or more computer systems, data records representing atomic elements of the component from a database based on the selection criteria, wherein each of the selected data records is associated with a component attribute, a component attribute value opinion; and one of the heterogeneous opinion sets;

identifying, with the one or more processors associated with the one or more computer systems, a first one of the selected data records including an association with a first component attribute and a first heterogeneous opinion set;

identifying, with the one or more processors associated with the one or more computer systems, a second one of the selected data records including an association with the first component attribute and a second heterogeneous opinion set that is stronger than the first heterogeneous opinion set;

determining, with the one or more processors associated with the one or more computer systems, whether the second one of the selected data records includes a suppression indicator associated with the first component attribute;

in response to a determination that the second one of the selected data records does not include the suppression indicator associated with the first component attribute, including, with the one or more processors associated with the one or more computer systems, the first component attribute in a resolved query result; and in response to a determination that the second one of the selected data records includes the suppression indicator associated with the first component attribute, excluding, with the one or more processors associated with the one or more computer systems, the first component attribute from the resolved query result;

generating, with the one or more processors associated with the one or more computer systems, information instantiating the component, wherein the inclusion of the first component attribute from the first heterogeneous opinion set in the instantiated component is determined by the inclusion of the suppression indicator associated with the first component attribute in the second heterogeneous opinion set.

36. The method of claim 35, wherein:
the first one of the selected data records includes an association with a second attribute and the first heterogeneous opinion set; and
the resolved query result includes the second attribute.

37. The method of claim 35, comprising:
outputting the resolved query result to an application.

38. The method of claim 35, wherein the database is a relational database.

39. The method of claim 35, wherein each data record includes a field specifying an association with one of the heterogeneous opinion sets.

40. The method of claim 35, wherein the database query includes the order of resolution.

41. The method of claim 35, wherein an implicit order of resolution determines the order of resolution.

42. The method of claim 41, wherein the implicit order of resolution is specified directly as an ordered list of heterogeneous opinion sets.

43. The method of claim 41, wherein the implicit order of resolution is based on at least one criterion provided from a group consisting of:

a default criterion; a command or instruction; configuration information; user specified information; application specified information; at least one attribute defined within data records from a database; and at least one attribute of at least one of the set of heterogeneous opinion sets.

44. The method of claim 1, wherein the first one of the selected data records does not include the second attribute.

45. The method of claim 1, wherein the order of resolution specifies that the first attribute value from the first one of the selected data records overrides a third attribute value for the first attribute from a third one of the selected data records.

46. The method of claim 16, wherein the scene description data structure specification includes a first attribute and first attribute value from a first one of the heterogeneous opinion sets and a second attribute and second attribute value from a second one of the heterogeneous opinion sets.

47. The method of claim 46, wherein the first one of the heterogeneous opinion sets does not include the second attribute.

48. The method of claim 46, wherein the order of resolution specifies that the first attribute value from the first one of the heterogeneous opinion sets overrides a third attribute value for the first attribute from a third one of the heterogeneous opinion sets.

\* \* \* \* \*